United States Patent [19]

Sodich

[11] Patent Number: 5,018,598
[45] Date of Patent: May 28, 1991

[54] APPARATUS FOR GENERATING SEISMIC WAVES

[75] Inventor: Ernest O. Sodich, Caldwell, Tex.

[73] Assignees: Emil A. Nakfoor; Mahesh Vyas, Houston, Tex. ; a part interest

[21] Appl. No.: 539,736

[22] Filed: Jun. 18, 1990

[51] Int. Cl.$^5$ .............................................. D01V 1/40
[52] U.S. Cl. .................... 181/106; 181/119; 181/401; 367/911
[58] Field of Search .................... 181/102-106, 181/119, 120, 401, 121; 367/911, 912, 189, 190, 143; 166/206, 212; 175/230; 340/853, 856

[56] References Cited

U.S. PATENT DOCUMENTS 4,252,210  2/1981  Sodich .................... 181/119
4,699,240  10/1987  Dedole .................... 181/113

Primary Examiner—Brian S. Steinberger
Attorney, Agent, or Firm—James F. Weiler

[57] ABSTRACT

Disclosed is an apparatus for generating seismic waves in a well bore, which apparatus includes a tubular expandable and contractible outer anchor wall, a seslf-contained anchor setting hydraulic system to expand the anchor into anchored position in the bore hole, a self-contained vibrator hydraulic system operable to cycle pressure impulses to the interior of the tubular expandable and contractible outer anchor wall effective to produce and radiate seismic waves, a cable including electric lines for locating the apparatus in the well bore, and switch means at the surface for controlling the operation of the apparatus. The apparatus is useful for geophysical investigation including vertical seismic profiling and cross hole tomography.

10 Claims, 4 Drawing Sheets

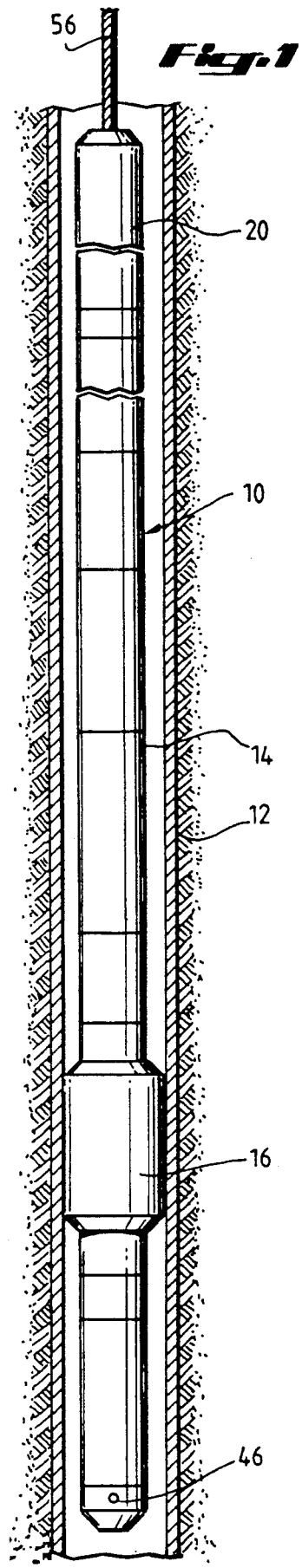
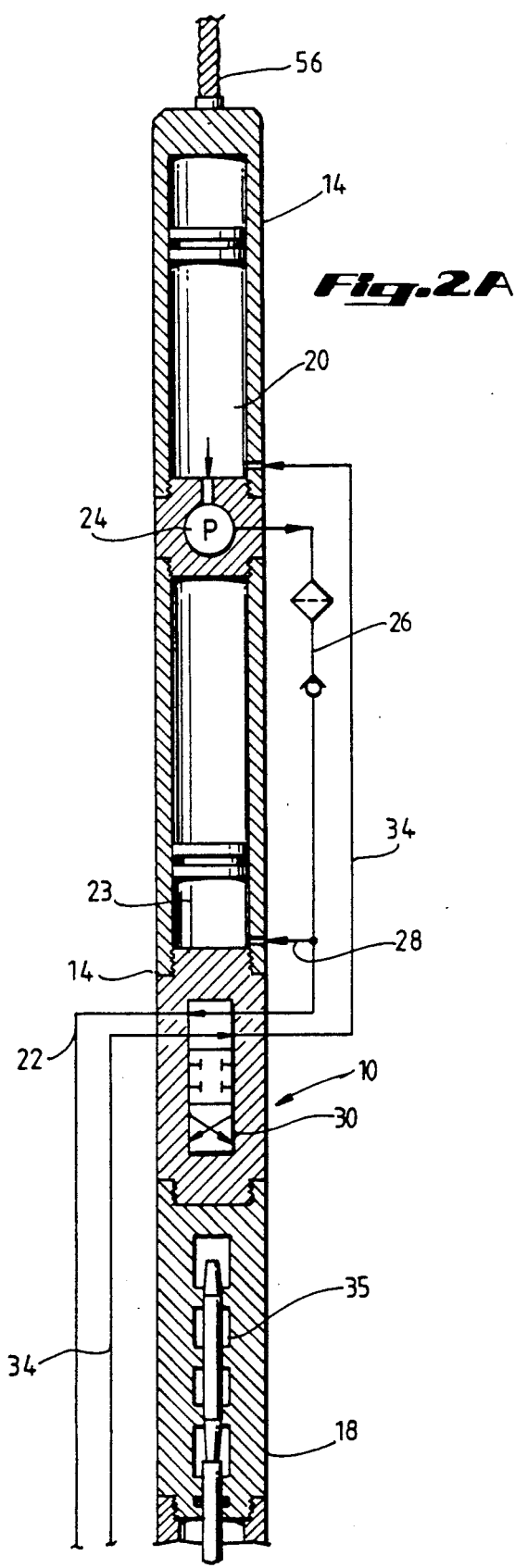

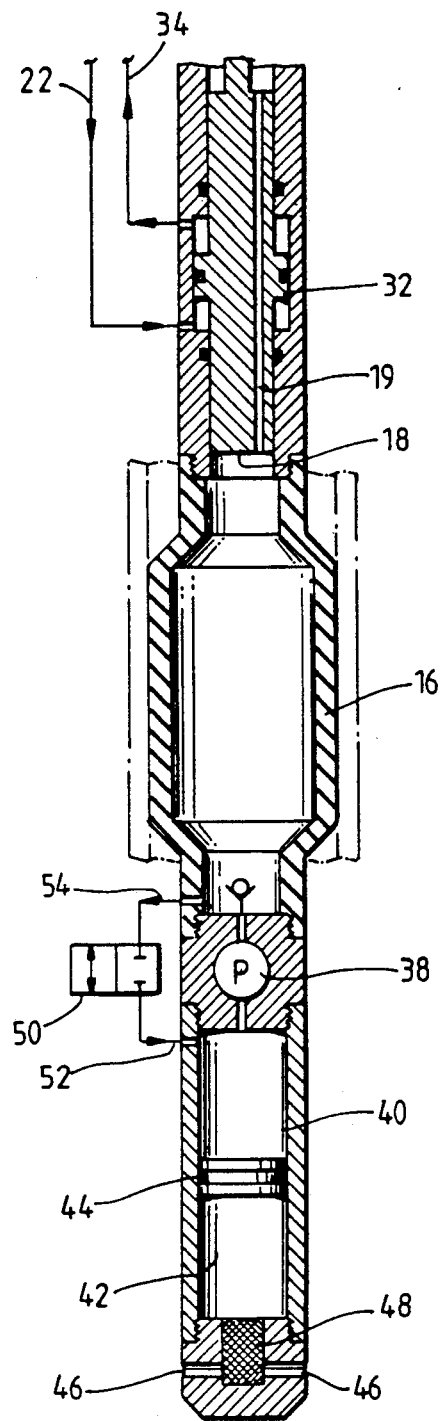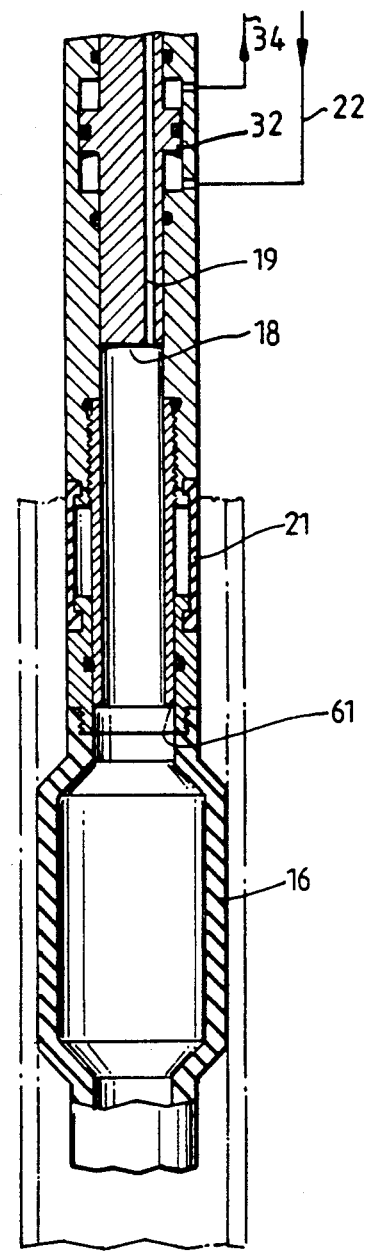

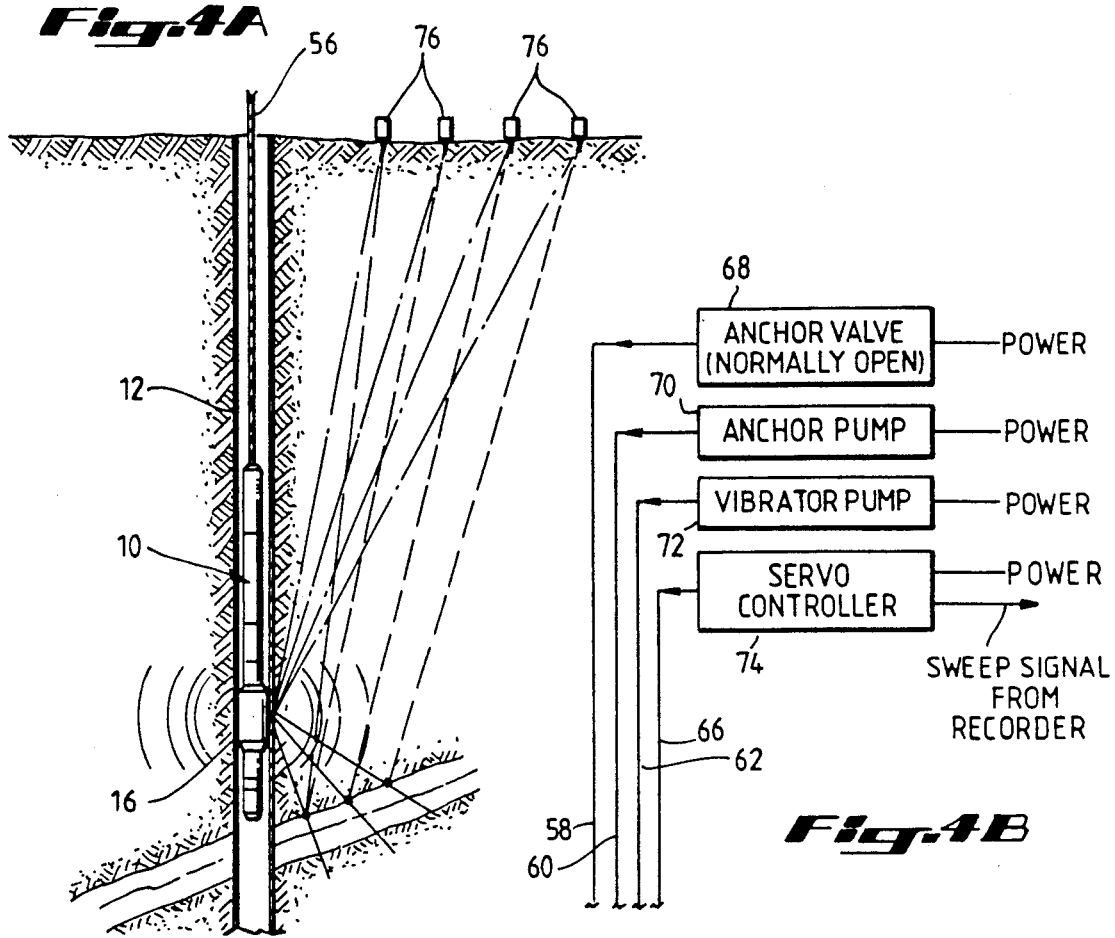
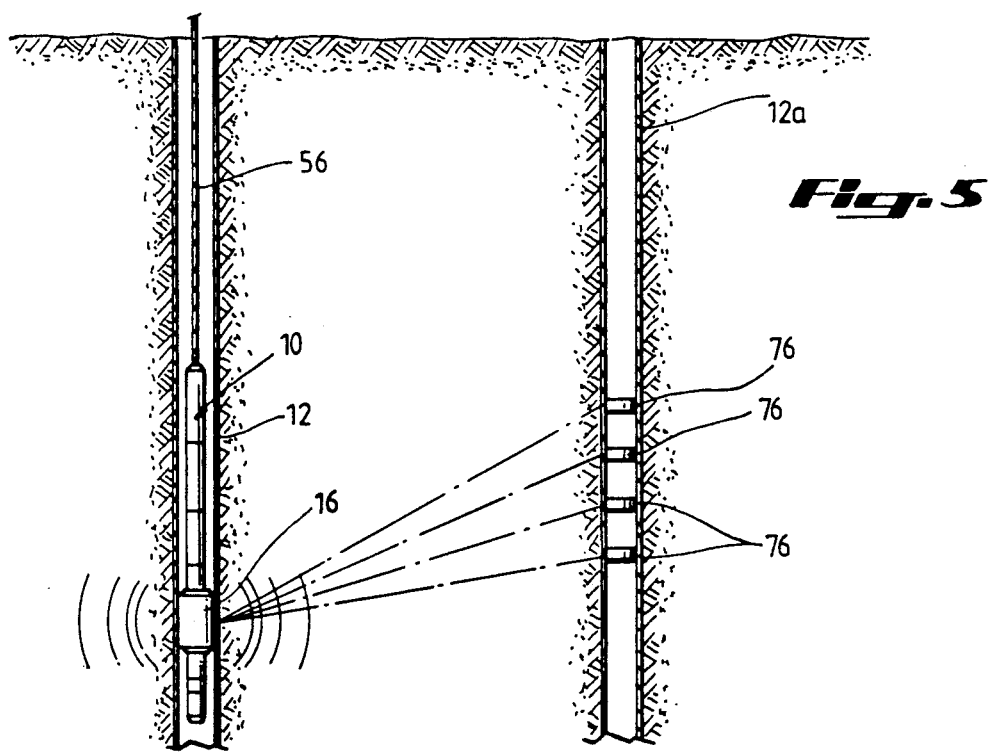

APPARATUS FOR GENERATING SEISMIC WAVES

FIELD OF THE INVENTION

The field of the invention is geophysical investigation known as vertical seismic profiling and cross-hole tomography.

BACKGROUND OF THE INVENTION

U.S. Pat. No. 4,252,210 discloses methods of and apparatus for generating seismic waves and discloses background information concerning the production of seismic waves including publications and patents.

The apparatus disclosed in U.S. Pat. No. 4,252,210 includes a tubular expandable outer wall closed at each end by rigid, high-strength closure members to which two different pressures applied from an external hydraulic reservoir, one for anchoring the generator to the wall and the second of greater intensity to provide the radiated waves which are directed only to the walls of the well bore. This apparatus has the advantages mentioned in said patent but is limited as to depths in use because of the external hydraulic reservoir and the hydraulic lines to and from the apparatus.

Other background disclosures include the following patents: U.S. Pat. No. 4,751,688 dated June 14, 1988 "Downhole Electromagnetic Seismic Source," U.S. Pat. No. 4,715,470 dated Dec. 29, 1987 "Downhole Electromagnetic Seismic Source," and U.S. Pat. No. 4,702,343 dated Oct. 27, 1987 "Nondestructive Downhole Seismic Vibrator to Obtain Information about Geologic Formations."

It would be highly desirable to provide an apparatus for generating seismic waves at greater depths than is practical for the apparatus disclosed in U.S. Pat. No. 4,252,210, for example, one which permits generation of seismic energy within a well bore to depths of 10,000 feet and more and in which the energy generated is of sufficient power and character as to produce suitable displacement on remotely located receivers or sensors (geophones) so as to be recorded and later recognized when processed by preprogrammed computers. It would also be advantageous to provide such an apparatus with self-contained hydraulic reservoirs and pumps and, accordingly, can be lowered into the well bore, anchored at a number of well bore locations, and removed from the well bore, all on conventional wire line equipment similar to that used for electrical logging and other operations in the well bore.

SUMMARY

The present invention is directed to such an apparatus for generating seismic waves within a well bore at great depths, that is, up to 10,000 feet and more, in which the energy generated is of sufficient power and character as to produce suitable displacement on remotely located receivers or sensors (geophones) so as to be recorded and later recognized when processed by preprogrammed computers, one that is lowered into, movable in, and retrievable in a well bore by conventional wire line equipment so that it is capable of repeated operation at the same location within the well bore or at several locations all during one trip in the well, and in which the energy produced does not cause damage to the well bore.

Accordingly, it is an object of the invention to provide an apparatus for generating seismic energy within a well bore at great depth, for example, down to 10,000 feet and deeper.

It is a further object of the present invention to provide an apparatus which generates seismic energy in geophysical investigation known as "vertical seismic profiling" and "cross-hole tomography" which require a seismic source with the capability of reliable operation at greater depths than heretofore practical within a well bore.

A further object of the present invention is the provision of such a seismic energy generator which generates energy with sufficient power and character to produce suitable displacement on remotely located receivers or sensors (geophones) so as to be recorded and later recognized when processed by preprogrammed computers.

It is a further object of the present invention to provide such a seismic energy generator which is capable of repeated operations at the same location within the well bore or at several different locations, all during one trip in the well.

It is a further object of the present invention to provide such a seismic energy generator in which the seismic energy produced does not cause damage to the well bore in which it is located.

It is a further object of the invention to provide such an apparatus which is completely operable by a well bore electric wire line similar to conventional logging equipment.

It is a further object of the present invention to provide such an apparatus which has self-contained hydraulic reservoirs for anchoring the apparatus and for pulsating the anchor to generate the seismic waves.

A further object of the present invention is the provision of such an apparatus in which the pulsations have discreet frequency content and an exact time span of energy.

Other objects, features, and advantages of the invention appear throughout the specification, claims, and drawings.

The foregoing objects, ends, and advantages are obtained by the present apparatus for generating seismic waves or energy, the preferred embodiments of which are described below. In summary, however, the apparatus has a generally elongated body including a tubular expandable and contractible outer anchor wall for anchoring the apparatus in a well bore.

An anchor setting hydraulic system is provided in the body which includes a hydraulic reservoir for hydraulic fluid or suitably filtered well fluid, an anchor pump, and valving in fluid communication with the interior of the expandable and contractible outer tubular wall, closing the valving, and actuation of the anchor pump being operable to pump hydraulic fluid into and anchor the anchor wall into anchored position in the well bore.

An anchor pulsating hydraulic system also is disposed in the body which includes low pressure and high pressure accumulator reservoirs, a vibrator pump in fluid communication with the low pressure reservoir and the high pressure reservoir, a servovalve, piston means, and separate pressure input and return lines from and to the reservoir in fluid communication through the servovalve to opposite sides of the piston means, so that upon energizing the vibrator pump and the servovalve, pressure impulses are intermittently applied to opposite sides of the piston means thereby reciprocating it and generating seismic waves. Means are provided biasing the piston means to a null position.

Pressure equalizing means are provided which equalize the setting pressure of the hydraulic fluid within the tubular anchor wall against the piston means, and additional pressure equalizing means are provided which equalizes pressure in the anchor reservoir with well fluid pressure within the well bore.

In operation, the apparatus for producing seismic energy is lowered into the well bore at the desired or preferred depth on conventional wire line equipment, the normally open anchor valving is closed and the anchor pump is energized which effects an expansion of the tubular anchor wall and anchors the apparatus in the well bore. Then the servovalve and vibrator pump are actuated which cause hydraulic pressure to be applied intermittently to opposite sides of the piston means thereby reciprocating it and causing pressure impulses in the hydraulic fluid within the tubular anchor wall which, in turn, causes intermittent expansion of the outer tubular wall effective to produce and radiate seismic waves or energy.

Differential pressures above hydrostatic hydroactive well pressures at the depth of operation of the order of 100 psi to 1000 psi are satisfactory for anchoring the apparatus in the well bore. Pressures above the anchoring pressure and of the order of about 1,000 to 3,000 psi are satisfactory for generating seismic energy of sufficient power and character to produce suitable displacement on remotely located receivers or sensors which are recorded and later recognized when processed by pre-programmed computers.

A more detailed description of presently preferred embodiments of the invention is set forth below.

BRIEF DESCRIPTION OF THE DRAWINGS

FIG. 1 is an elevational view illustrating apparatus for generating seismic waves according to the invention shown in a well bore in the earth.

FIGS. 2A and 2B are a sectional elevation of the apparatus of FIG. 1.

FIG. 3A is an elevational view, partly in section, illustrating another embodiment of the apparatus of FIG. 1.

FIGS. 4A and 4B are elevational views, partly in section, of the apparatus of the foregoing figures, in place in a well bore for vertical seismic profiling.

FIG. 5 is a view similar to FIG. 4 for cross-hole tomography.

DESCRIPTION OF PREFERRED EMBODIMENTS

Figure 3B:
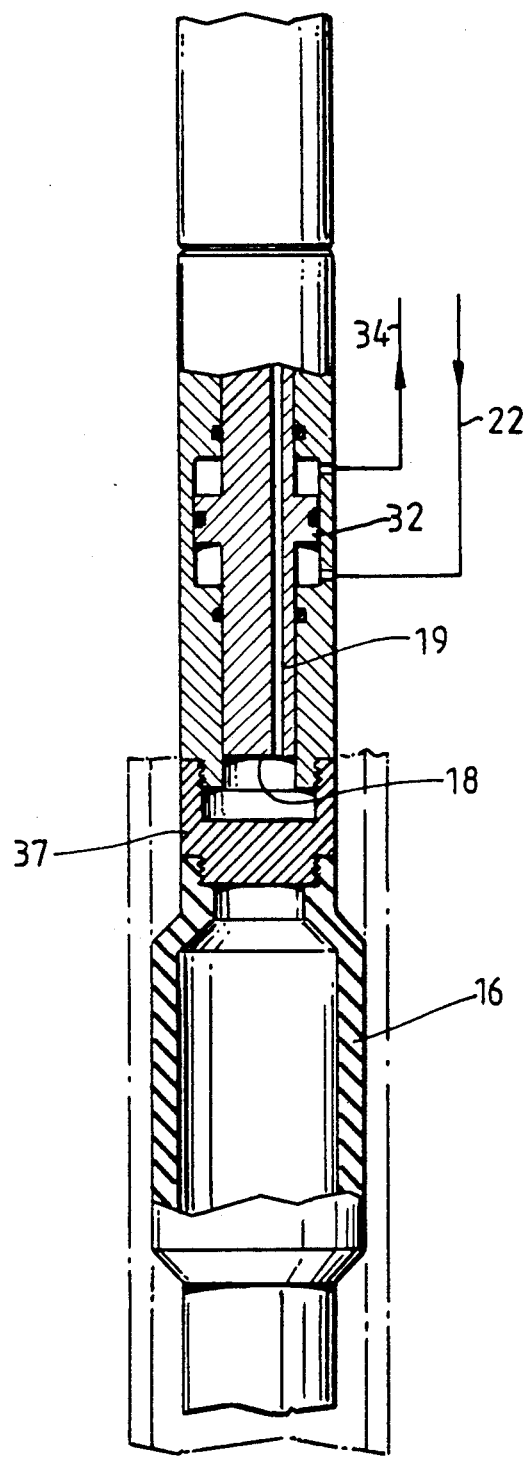
FIG. 3B is an elevational view, partly in section, illustrating a still further embodiment of the apparatus of FIG. 1.

Referring now to FIG. 1, an apparatus 10 is disclosed and is shown anchored in a well bore 12. The apparatus has a generally elongated and tubular body 14 and can be anchored in the well bore 12 by the tubular expandable and contractible outer wall 16.

Referring now to FIGS. 2A and 2B, the apparatus 10 for generating seismic waves or energy includes two separate self-contained hydraulic systems and piston means which includes an actuator 18 which interfaces between them. One of the hydraulic systems may be termed a "vibrator" or "pulsator" hydraulic system, and the other hydraulic system may be termed an "anchor" hydraulic system for convenience of reference.

Referring first to the vibrator hydraulic system, at the upper portion of the body 14 of the apparatus 10 are a low pressure hydraulic fluid reservoir and accumulator 20 and a high pressure hydraulic fluid reservoir and accumulator 23. Each of the reservoirs 20 and 23 is energized by gaseous precharge, such as nitrogen, that is predetermined to provide the desired operating characteristics. For example, the low pressure precharge may be 100 psi and the high-pressure precharge may be 1000 psi.

A vibrator pump 24 is provided which pumps hydraulic fluid from the low pressure hydraulic fluid reservoir 20 through the lines 26 and 28 into the high pressure fluid reservoir 23. Thus, when the vibrator pressure pump 24 is operating, it is constantly charging the fluid side of the high pressure reservoir 23.

The hydraulic line 22 provides hydraulic pressure against one side of an annular piston 32 disposed intermediate the sides of the actuator mandrel 18, and the hydraulic pressure line 34 returns the hydraulic fluid through the three-stage servovalve 30 into the low pressure hydraulic fluid reservoir 20. Thus, when the high pressure pump 24 is operating, it is constantly charging the fluid side of the high pressure reservoir 22 and supplying pressure to the three-stage servovalve 30. When the servovalve 30 is actuated in response to a predetermined electrical signal, hydraulic pressure is applied through the servovalve 30 to opposite sides of the actuator piston 32, and hydraulic fluid is returned through the servovalve 30 to the low pressure hydraulic fluid reservoir 20. Thus, a closed, self-contained hydraulic system is provided in the apparatus 10.

A feedback centering valve 35 is provided which is a hydraulic biasing unit providing a hydraulic signal to the servovalve 30 which is proportional and opposite to the displacement of the piston 32. The hydraulic lines connecting the feedback centering valve 35 and the three stage servovalve 30 are not shown. The feedback centering valve 35 operates independently of the electrical control; accordingly, the piston is constantly being biased toward a center or null position. Any feedback centering valve or device may be used, which are generally known as fluid repeaters and which are available on the market. Various fluid repeaters which are satisfactory for use in the present invention are disclosed in U.S. Pat. Nos. 4,335,645; 4,227,440; 4,404,897. Accordingly, no detailed description is deemed necessary or given of these fluid repeaters.

Disposed below the actuator 18 is an anchoring hydraulic system which includes the elongated tubular expandable and contractible outer wall 16 which serves as an anchor for the apparatus 10 as well as a generator of seismic waves. The anchor and generator, essentially, are a packer used in oil wells, such as in drill stem testing, hydraulic fracturing, acidizing, and other remedial operations and in some completions and productions. Such packers are commercially available from Baker Hughes, Inc. and Tam Inc., both of Houston, Tex.

As previously mentioned, this outer wall portion 16 comprises the anchor for the apparatus 10 and is the generator of the seismic waves. Preferably, it is reinforced with overlapping, metal strips which overlap and slide with respect to one another, or flat braided metal wire, or tubular raid, not shown, or other materials of sufficient strength can be used. Also, if desired, an outer elastic cover for the strips or braided metal wire may be provided or omitted.

An anchor setting pump and motor 38 and an anchor setting hydraulic fluid reservoir 40 are provided in the apparatus 10. Fluid pressure in the well bore 12 and in the hydraulic fluid reservoir 40 are equalized. To this end, a piston 44 is provided to close the hydraulic fluid anchor reservoir 40 and to separate it from the well fluid reservoir 42. Well fluid in the bore hole 12 enters through the passages 46 and screen 48 into the well fluid reservoir 42. Thus, pressure in the anchor setting reservoir 40 is equalized at all times with the pressure of the well fluid in the well bore 12.

A valve 50 is provided, which is normally in open position, and hydraulic pressure lines 52 and 54 are provided through the valve 50 so that the hydraulic fluid in the anchor setting reservoir is in fluid communication with the interior of the hydraulic anchor 16.

Thus, by actuating the anchor pump 38 and closing the valve 50, the expandable tubular wall 16 can be expanded into anchoring position with the well bore or casing 12 to the desired setting pressure. Pressures of the order of 100 psi to 1000 psi are satisfactory.

Disposed within the actuator 18 is a passage 19 which provides fluid communication between the interior of the anchor 16 bearing against the lower end of the actuator 18 and the upper end of the actuator 18 to balance and equalize the pressures on each side of the actuator 18. Also, as seen in FIG. 3A, a vibration dampner in the form of a coupling 21 may be provided to isolate piston reaction from the anchor 16 so that the energy output is from the piston pressure pulsations only. Such vibration dampner is conventional, and any satisfactory vibration dampner can be used. If desired, a hydraulic hose, not shown, can be used to connect the vibrator 18 and the anchor 16 to isolate the vertical reaction of the piston mass 18 and to transmit pressure impulses to the anchor 16.

The pumps 24 and 38 preferably are of the type which maintain a preset pressure. These pumps are available on the commercial market and no detailed description is given or deemed necessary.

The apparatus 10 is lowered into, located in the well bore 12, relocated, if desired, and removed from the well by a power control and lift cable generally referred to by the reference numeral 56.

Referring now to FIGS. 4A and 4B, the cable 56 includes the electric lines 58, 60, 62 and 66 which include switch means at the surface for providing electrical energy to the operating parts. The switch means includes the switch 68 for the anchor valve 50, the switch means 70 for the anchor pump 38, the switch 72 for the vibrator pump 24, and a servo controller 74 for the servovalve 30. Advantageously, while the apparatus is completely self-contained, its functions and operations are controlled at the surface.

In use, the apparatus 10 is lowered into the well bore 12, which may be either cased or uncased, with the anchor valve 50 open and the anchor 16 in retracted position. In this connection, FIG. 1 illustrates the hydraulic anchor 16 pressurized to engage the well bore 12, and FIG. 2A illustrates when the operating mode is approaching the end of an energy sweep cycle.

The apparatus is run to the desired depth on the cable 56 as in a typical logging operation. At the desired depth, the anchor setting valve 50 is closed by the switch 68, and the anchor setting pump 38 is activated by the switch 70 thereby expanding the tubular expandable anchor 16 into anchored engagement with the wall of or casing in the well bore 12. The vibrator charge pump 24 and the servovalve 30 are then activated by the switch 72 and the servo controller 74.

As previously mentioned, the apparatus 10 is shown (in FIGS. 1, 2A and 2B) with the anchor 16 pressurized and engaging the well bore 12 and in an operating mode during the end of an energy sweep cycle in which the high pressure hydraulic fluid in the high pressure reservoir is nearly depleted and the low pressure reservoir 20 is near full. Pump 24 is activated at all times during the operating cycle, both during and between vibrator operations or sweep cycles. As the high pressure reservoir 22 is being depleted, the vibrator operating pressure may diminish. This is compensated for by adjusting the servo drive level signal to provide for a more constant seismic force output at the anchor 16.

When the apparatus 18 is to be relocated, the anchor valve 50 is opened and the anchor setting pressure is released and equalized with the well fluid. The anchor then contracts to its original size. The vibrator pump 24 and servovalve 30 are deactivated, and the apparatus 10 becomes free for movement to the next setting or removal from the well, as desired. Advantageously, all operations are controlled at the surface, as previously mentioned.

Referring again to FIGS. 4A and 4B, the apparatus 10 is shown for vertical seismic profiling. Here, the apparatus 10 is shown anchored in the well bore 12 and a series of receivers or geophones 76 of conventional type are placed on the surface. The receivers 76 record both the upcoming first rays and the reflected energy rays. Multiple sweeps at a location of interest are provided.

This procedure is the reverse of what is presently being done in vertical seismic profiling; that is, the energy source is deployed on the surface near the well and the receivers 78 are located downhole.

FIG. 5 illustrates the apparatus 10 in use for crosshole tomography which is somewhat similar in principal to a medical cat-scan of tissue. Here the apparatus 10 is run to a depth of interest and operated at a number of predetermined intervals, for example 35 foot intervals. The receivers 76 are fixed in a well bore 12A at predetermined intervals. The receivers 76 receive the direct path rays as shown and in addition, reflections, both up and down, received by the receivers 76.

The apparatus 10 can be run into the well 12 and retrieved from the well 12 by a typical logging-type vehicle with instrumentation, not shown, to run the apparatus 10 to an exact depth. Vehicles in commercial use have sufficient cable on a cable drum and a drive system for this purpose.

Referring now to FIG. 3B, the apparatus is illustrated in which the actuator mandrel 18 and piston 32 are isolated from the hydraulic setting fluid and the anchor 16 by means of a decoupling fitting 37 closing the interior of the anchor 16. As a result, fluid pulsations caused by the actuator mandrel in contact with the hydraulic setting fluid in the anchor 16 resulting from the reciprocation of the actuator 18 in contact with the anchor fluid is removed. The seismic energy generated by the reciprocation of the mandrel 18 and the piston 32 is transferred to the well bore 12 through the anchor 16 as a reaction to the mass of the actuator and piston as it reciprocates. This is vertical in nature or longitudinal to the well bore. All other parts of the apparatus 10 and its operation are the same as that of FIGS. 1 and 2.

Thus, the apparatus is completely self-contained and is lowered into a well bore on an electrical wire line cable and set at any desired depth and is capable of being relocated to any number of horizons without returning to the surface. Any number of energy cycles may be accomplished at any particular horizon. All operations are controlled from the surface.

Different sizes of tool assemblies are used for different diameters and weights of well bores and casing; although, a single apparatus may be satisfactory for a range of sizes within the capability of the hydraulic anchor 16.

The output of the apparatus is of sufficient power to generate appreciable seismic energy. The operating cycle can be programmed to optimize energy transmissions.

The apparatus of the invention may be used as an energy source for seismic operations, shear wave generation, vertical seismic profiling and cross-hole investigations as well as other uses.

If desired, one or more of the apparatus 10 and arrays of the apparatus 10 can be utilized and their outputs synchronized to provide signal enhancement rather than signal cancellations. This is accomplished by sensing the actual hydraulic pressure within each of the generators, producing a signal of the actual pressure, and comparing this signal with the input signal which controls the pressure cycle. This produces an error signal in proportion to the degree of phase disagreement which modifies the input signal which controls the hydraulic pressure cycling and attempts to bring about synchronization with the true input signal. The other generators operate in like manner in response to the same radio input signal. Thus, all the generators are "locked in" or synchronized on the same drive signal. Also, the pressure sensor signals may be displayed and compared, such as on a dual-trace oscilloscope.

For convenience of disclosure, several features of the apparatus 10 are shown in a drawing rather than in separate drawings, and one or more or all of the features may be included in an operating apparatus for generating seismic waves in a well bore.

The present invention, therefore, is well suited and adapted to attain the objects and ends and has the advantages and features mentioned as well as others inherent therein which are within the spirit of the invention and encompassed within the scope of the accompanying claims.

What is claimed is:

1. Apparatus for generating seismic waves in a well bore comprising,
   an elongated body including a tubular expandable and a contractible outer anchor wall,
   a self-contained anchor setting hydraulic system in the body including an anchor hydraulic reservoir, an anchor setting pump operable to pump hydraulic fluid from the anchor hydraulic reservoir into the anchor wall's interior and expand the anchor wall into anchored position in the well bore, a normally open anchor valve equalizing pressure in the anchor hydraulic reservoir with pressure in the well bore when open and operable to prevent flow of the hydraulic fluid therefrom when closed, and electric means for actuating the anchor setting pump for closing and opening the valve,
   a self-contained vibrator hydraulic system in the body including a vibrator operable when activated to cycle pressure impulses to the interior of the tubular and contractible outer anchor wall effective to produce and radiate seismic waves, a vibrator hydraulic reservoir, a vibrator pump, and a vibrator valve operable to cycle hydraulic pressure to the vibrator actuating the vibrator,
   a cable connected to the apparatus for locating the apparatus in the well bore, and
   electrical means including surface switch means and electric lines in the cable operable to actuate the anchor pump, the anchor valve, the vibrator pump and the vibrator valve.

2. The apparatus of claim 1, where
   the vibrator valve comprises a servovalve and the surface switch means includes a servocontroller actuating the servovalve effective for cycling the pressure impulses.

3. The apparatus of claim 1, including
   means equalizing pressure of the anchor setting hydraulic system on the vibrator.

4. The apparatus of claim 1, including
   means to isolate vertical reaction of the vibrator hydraulic system from the anchor setting hydraulic system.

5. Apparatus for generating seismic waves in a well bore comprising,
   an elongated body including a tubular expandable and contractible outer wall,
   an actuator mandrel provided with a piston disposed within a portion of the elongated body,
   a vibrator hydraulic system in the body including low pressure and high pressure accumulator reservoirs,
   a vibrator pump in fluid communication with the low pressure reservoir and the high pressure reservoir,
   a servovalve in the body,
   separate pressure input and return lines through the servovalve and to opposite sides of the piston providing pressure impulses to the opposite sides of the piston when the servovalve is energized thereby reciprocating the actuator piston and the actuator mandrel,
   an anchor hydraulic system in the body including an anchor hydraulic reservoir,
   a normally open anchor valve equalizing pressure in anchor hydraulic reservoir with pressure in the well bore when open and operable to prevent flow of the hydraulic fluid therefrom when closed,
   and an anchor pump in fluid communication with the interior of the expandable and contractible outer tubular wall, actuation of the anchor pump operable to pump hydraulic fluid into the anchor wall's interior and to expand the anchor wall into anchored position in the well bore,
   a cable connected to the apparatus for locating the apparatus in the well bore, and
   electrical means including electric lines in the cable and switch means at the bore hole's surface operable to actuate the vibrator pump, the anchor pump, the anchor valve and the servovalve.

6. The apparatus of claim 5, including
   hydraulic means biasing the actuator piston to a null position.

7. The apparatus of Claim 5, including
   pressure equalizing means in the body effective to equalize hydraulic anchor setting pressure bearing against the actuator mandrel.

8. The apparatus of claim 5, where
   an end of the actuator mandrel engages the anchor hydraulic fluid in the interior of the tubular wall,
   reciprocation of the actuator mandrel pulsing the hydraulic fluid in the interior of the tubular wall thereby generating the seismic waves.

9. The apparatus of Claim 5, including means blanking off the actuator mandrel from engaging the hydraulic fluid in the interior of the tubular wall of the anchor system, the mass of the piston and the actuator mandrel when reciprocating causing a reaction in the tubular wall effective to radiate seismic energy.

10. The apparatus of claim 5, including means effective to isolate vertical reaction of the actuator mandrel and piston from the anchor hydraulic system.

* * * * *